United States Patent
Stueber et al.

(10) Patent No.: US 6,880,745 B2
(45) Date of Patent: *Apr. 19, 2005

(54) METHOD OF DIFFUSION BONDING SUPERALLOY LAMINATES

(75) Inventors: Richard J. Stueber, Paradise Valley, AZ (US); Brenton L. Blanche, Tempe, AZ (US)

(73) Assignee: Triumph Brands, Inc., Wayne, PA (US)

( * ) Notice: Subject to any disclaimer, the term of this patent is extended or adjusted under 35 U.S.C. 154(b) by 378 days.

This patent is subject to a terminal disclaimer.

(21) Appl. No.: 10/200,770

(22) Filed: Jul. 22, 2002

(65) Prior Publication Data

US 2004/0169063 A1 Sep. 2, 2004

Related U.S. Application Data

(63) Continuation-in-part of application No. 09/747,158, filed on Dec. 22, 2000, now Pat. No. 6,464,129.

(51) Int. Cl.⁷ ............................................... B23K 31/00
(52) U.S. Cl. ....................................... 228/194; 228/205
(58) Field of Search ................................. 228/193, 194, 228/195, 201, 202, 205, 206, 207, 208

(56) References Cited

U.S. PATENT DOCUMENTS

| | | | | |
|---|---|---|---|---|
| 3,628,226 A | * | 12/1971 | Nelson | 29/899.72 |
| 3,971,875 A | * | 7/1976 | Regalbuto | 219/243 |
| 4,055,988 A | * | 11/1977 | Dutton, Jr. | 73/620 |
| 4,059,217 A | * | 11/1977 | Woodward | 228/181 |
| 4,087,037 A | * | 5/1978 | Schier et al. | 228/106 |
| 4,474,044 A | * | 10/1984 | Leistner et al. | 72/19.1 |
| 5,431,804 A | * | 7/1995 | Caballero | 205/621 |
| 5,735,448 A | * | 4/1998 | Draghi et al. | 228/119 |
| 5,933,951 A | * | 8/1999 | Bergue et al. | 29/889.72 |
| 6,337,471 B1 | * | 1/2002 | Kistner et al. | 219/633 |
| 6,464,129 B1 | * | 10/2002 | Stueber et al. | 228/194 |
| 2002/0104875 A1 | * | 8/2002 | Stueber et al. | 228/194 |
| 2003/0152705 A1 | * | 8/2003 | Pfaendtner et al. | 427/376.1 |
| 2004/0115355 A1 | * | 6/2004 | Bauer et al. | 427/376.1 |
| 2004/0169063 A1 | * | 9/2004 | Stueber et al. | 228/194 |

\* cited by examiner

Primary Examiner—Kiley S. Stoner
(74) Attorney, Agent, or Firm—John D. Titus

(57) ABSTRACT

A method of joining superalloy substrates together comprises diffusion bonding the superalloy substrates by depositing an activator directly on the surface of the joint to be bonded and thereafter subjecting the joint to heat and pressure. The heat and pressure causes the surface of the superalloy, in the presence of the activator, to diffusion bond without the use of a brazing alloy. By eliminating the brazing alloy, a high strength, high temperature bond is achieved, yet there is no molten brazing alloy to be drawn through capillary action into any fine features surrounding the joint being bonded, and there is no residue left at the interface that would diminish the mechanical or chemical properties of the joint.

23 Claims, 1 Drawing Sheet

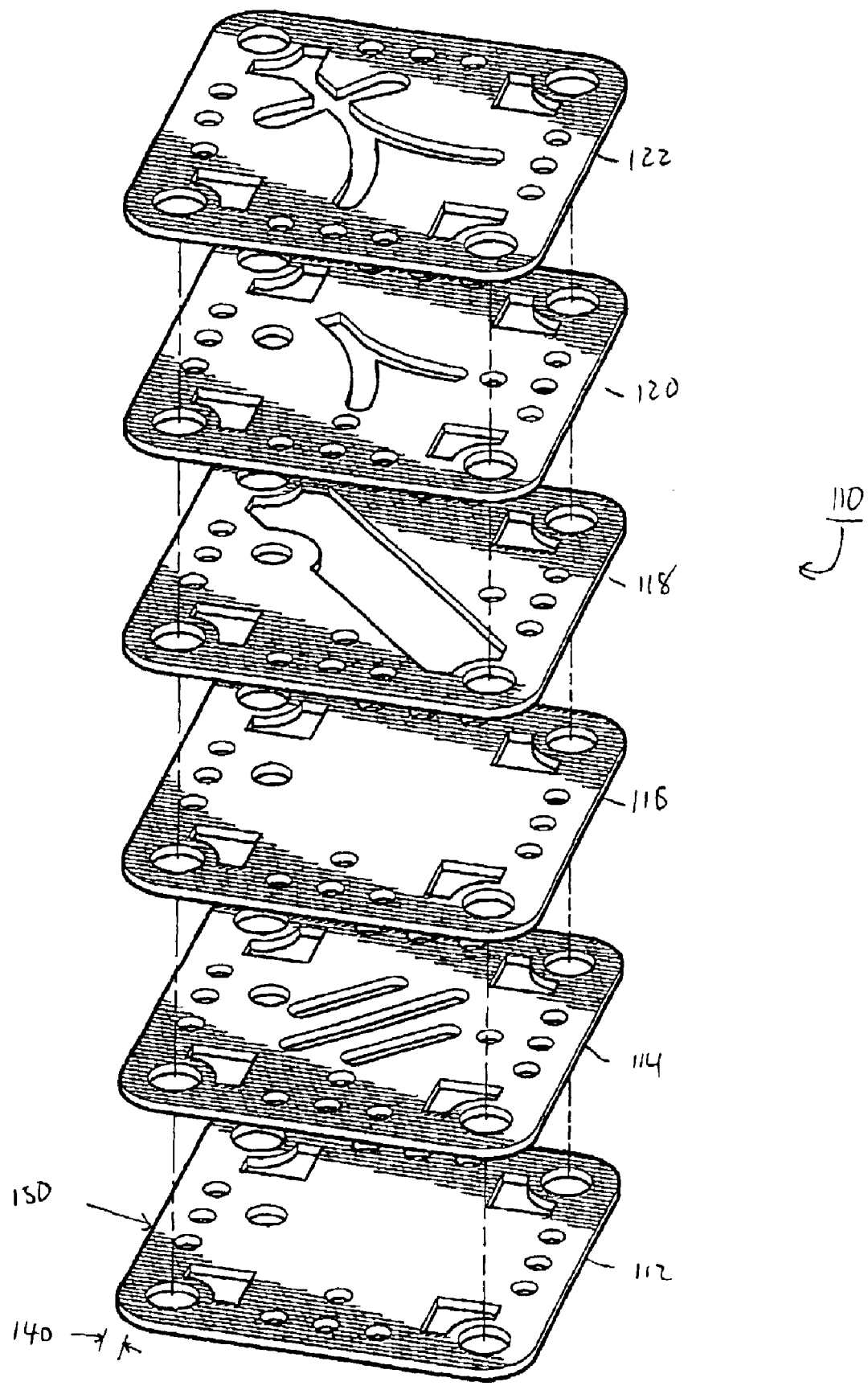

METHOD OF DIFFUSION BONDING SUPERALLOY LAMINATES

This application is a CIP of Ser. No. 09/747,158 filed Dec. 22, 2000, now U.S. Pat. No. 6,464,129.

BACKGROUND OF THE INVENTION

The present invention relates to the fabrication of components made from superalloys, specifically to a method of bonding superalloys at an interface.

Superalloys are employed in articles such as gas turbine hot section components, high temperature heat exchangers and high temperature fluidic circuit devices because they exhibit high strength at elevated as well as ambient temperatures. Typical superalloys are nickel-based superalloys (such as INCONEL 718, INCONEL 617 and RENE 80) or cobalt-based superalloys (such as HASTELLOY X, X-40 and FSX-414). Iron-based superalloys (such as V-57) are also common. Frequently, superalloy components intended for use in heat exchangers and fluidic circuit devices having finely detailed internal passages must be bonded together using specialized diffusion brazing alloys.

Diffusion brazing relies on the solid-state diffusion of atoms across an interface of the joint between the brazing alloy and the base metal. It necessarily follows that the diffusion brazing alloys are formulated to complement the base material of the parts being joined. Diffusion brazing alloys are thus generally nickel, iron, or cobalt-based alloys, depending on the composition of the base metal, combined with one or more melting point depressants such as boron or silicon. Brazing compounds thus have a composition similar to the base alloy but a melting point that is below that of the base metal. Brazing compounds are typically provided in the form of a powder, paste, or thin foil. The bonding of a joint is effected by placing the braze material on the joint and heating the joint to a temperature above the melting point of the brazing alloy but below the incipient melting point of the base alloy. The brazing material is drawn through capillary action into the joint and, upon cooling, forms a strong metallic bond across the joint.

Brazing is not without its disadvantages. Where the parts being joined have extremely finely detailed features such as grooves or passages, the brazing alloy often wicks into and partially or completely obstructs these features. For example, the cooling panels in the transition ducts of an advanced high temperature industrial gas turbine have small cross-section cooling passages. The cooling panels are conventionally manufactured by milling a series of channels in a superalloy sheet and brazing a superalloy cover sheet over the milled channels. Conventional process controls have proved ineffectual in preventing the braze alloy from wicking into the cooling passages resulting in a high incidence of rejected parts Similarly, fluidic circuits are often composed of up to several score or more of laminated sheets 0.050 inch, 0.020 inch or even thinner. Braze alloy wicking into even one of the fine passageways of a fluidic circuit device renders the entire assembly useless.

Another disadvantage of brazing is that, because the braze alloy has a lower melting point than the surrounding base material, in extremely high temperature applications, the braze alloy will soften at a temperature lower than that of the surrounding part. The temperature limitation of the braze alloy therefore limits the operating temperature of the whole assembly. Additionally, where heat exchangers or fluidic circuits are handling highly corrosive working fluids such as the liquid sodium coolant used in fast breeder reactors, often the resistance of the brazing alloy to chemical attack is inferior to that of the base material, which limits the useful life of such devices. Post brazing heat treating improves to some extent the properties of brazed joints by diffusing the melting point depressants out of the brazed joint and into the surrounding base metal, however it is not possible to completely eliminate the braze alloy from the joint. Some interfacial residue always remains.

What is needed therefore is a method of diffusion bonding superalloy components without the use of brazing alloys.

SUMMARY OF THE INVENTION

The present invention comprises a method of diffusion bonding superalloy substrates by depositing an activator directly on the surface of the joint to be bonded and thereafter subjecting the joint to heat and pressure, which causes the surface of the superalloy, in the presence of the activator, to diffusion bond without the use of a brazing alloy. By eliminating the brazing alloy, a high strength, high temperature bond is achieved, yet there is no molten brazing alloy to be drawn through capillary action into any fine features surrounding the joint being bonded, and there is no residue left at the interface that would diminish the mechanical or chemical properties of the joint.

BRIEF DESCRIPTION OF THE DRAWING

The present invention will be better understood from a reading of the following detailed description, taken in conjunction with the accompanying drawing figure, in which:

FIG. 1 is an exploded perspective view of a fluidic proportional amplifier incorporating features of the present invention.

DETAILED DESCRIPTION

An illustrative embodiment incorporating features of the present invention will be described hereinafter in connection with the fabrication of a fluidic circuit device comprising a proportional amplifier handling a liquid metal in a fluidically controlled liquid metal cooling circuit. As shown in FIG. 1, amplifier 110 comprises a plurality of sheets 112, 114, 116, 118, 120, and 122 of rolled nickel-based superalloy INCONEL 617 (obtained from Haynes Stellite) having a series of slots, passages and apertures common to such devices.

It is not necessary that the surfaces of the sheets be finished to a smoothness better than the smoothness of the mill-rolled INCONEL sheets, however, smoother surface finishes may be preferable for some applications. Similarly, surface finishes that are rougher than the mill finish of the Haynes Stellite rolled INCONEL sheets may be acceptable for some applications where bond strength is not as critical.

Unlike brazing processes, which are somewhat tolerant of surface oxidation, for best results, diffusion bonding must be carried out with a surface that is substantially oxide-free. In order to ensure that the surfaces of the sheets are free of oxides and other contaminants that would inhibit the diffusion bonding process, the sheets are first cleaned with an organic solvent such as acetone or alcohol to remove any organic contaminants. The sheets are then subjected to a halide ion cleaning process in which the sheets are exposed to a gaseous halide solution, preferably a solution of hydrogen fluoride, most preferably 10% hydrogen fluoride mixed with hydrogen, at an elevated temperature above 1000 degrees Fahrenheit. Preferably the temperature is held above the aging temperature of the superalloy, but below the incipient melting point. Most preferably the temperature is maintained at 1900 degrees Fahrenheit plus or minus 100 degrees Fahrenheit. The panels are exposed to the hydrogen fluoride environment at elevated temperature for a period of 2–5 hours, preferably about 4 hours, after which the hydrogen fluoride chamber is evacuated along with the by-products of the fluoride cleaning process. This cycle is repeated a second time to ensure that the surfaces of the panel are substantially oxide free. Once the sheets have been subjected to the halide ion cleaning, they are handled with powderless latex gloves and sealed in plastic bags to avoid contamination.

The fluoride-cleaned panels are then sprayed with an activator material comprising a solution of borane-dimethylamine ($C_2H_{10}NB$) in distilled water. In the illustrative embodiment, three grams of borane-dimethylamine (obtained from Spectrum-Quality Products of Gardenia, Calif. and New Brunswick, N.J.) are dissolved in each liter of water. It is believed by the inventors of the present invention that although boron is a well-recognized melting point depressant for superalloys, the boron contained in the borane-dimethylamine acts as an activator to increase the surface activity of the superalloy substrate when exposed to high temperature, but without inducing any observable melting. Accordingly, any method of applying a thin film of boron, silicon or any other melting point depressant that is substantially free of Iron, Nickel, or Cobalt (the primary constituents of typical superalloy base metals and braze alloys) is considered within the scope of the present invention. By "substantially free" of Iron, Nickel, or Cobalt, what is meant herein is that neither Iron, Nickel, nor Cobalt is present in sufficient quantity to act as a filler to wick into the gaps between the mating surfaces of the surfaces being joined. Instead, the base material itself forms the joint without any filler.

In addition to organic amines, other organic carriers (containing carbon, small amounts of which can diffuse into the superalloy substrate without deleterious effects, and hydrogen, which is easily driven off during the hot isostatic pressing step described hereinafter) would be suitable as a delivery mechanism for depositing the boron on the surface of the substrate. The organic carrier should, however, be relatively free of oxygen because oxygen, in sufficient quantity, will tend to form oxides of the superalloy thus inhibiting the diffusion bonding process. Additionally, although boron is preferable, other melting point depressants such as silicon would be acceptable surface activators. Boron is preferred, however, because silicon is known to have an adverse effect on the mechanical properties of the superalloy substrate. Finally, although water is the preferred diluent, other volatile organic diluents such as alcohols, ethers, ketones and the like are considered within the scope of the present invention.

In the illustrative embodiment, the solution of borane-dimethylamine is sprayed onto the surface of the sheets with an ordinary hand-operated spray bottle until the surfaces are thoroughly wet. The sheets are allowed to drip dry, after which the sheets are again sprayed with the borane-dimethylamine solution. Once dried, a thin, somewhat irregular residue of borane-dimethylamine (between a few microns to about 20–50 microns, but less than 0.001 inch) remains on the surface of the sheets to act as a diffusion bonding activator. Although spraying is preferred in order to minimize waste of the activator solution, other methods of applying the borane-dimethylamine solution, such as dipping the panels in a tank of borane-dimethylamine solution, or electrostatic fogging, are considered within the scope of the present invention.

In the illustrative embodiment, in order to apply a uniform load over the entire surface being bonded without distorting the sheets, the diffusion bonding process takes place within a hot isostatic press. Accordingly, prior to the hot isostatic pressing operation, the perimeters of the sheets forming the assembly are welded together along the perimeter 130 to form a sealed chamber. The sheets are welded in an inert environment (such as argon), or in a vacuum. This is to ensure that little or no oxygen is trapped inside the fluidic assembly to inhibit the diffusion bonding process. Accordingly, as used herein, "inert" environment or "inert" atmosphere is not limited to an environment consisting of inert gases, but can mean either an inert gas, a mixture of inert gases, or a vacuum, provided the atmosphere is substantially free of oxygen (i.e. oxygen is not present in sufficient quantity to interfere with the diffusion bond). The perimeter welding may be effected by any conventional welding method such as tungsten inert gas (TIG), electron beam welding or other conventional welding technique used with high temperature superalloys. A sufficient margin 140 is provided around perimeter 130 of each of the sheets such that the microstructure of the sheet in its final form will not have had its microstructure affected by the welding process.

The welded fluidic amplifier assembly is diffusion bonded by subjecting the assembly to a temperature of 2040 degrees Fahrenheit plus or minus 25 degrees Fahrenheit at a pressure of 1000 to 1050 PSI for a period of 45 to 70 minutes in a hot isostatic press, after which the assembly is cooled. The hot isostatic press provides sufficient pressure to force the joints together (obviating the need for a braze alloy to act as a filler) while elevating the temperature to raise the activity of the surface such that, in the presence of the activator, the molecules of the base material interdiffuse. Although the illustrative embodiment is diffusion bonded at 2040 degrees Fahrenheit, any elevated temperature above the temperature at which molecular diffusion occurs (the activation temperature) up to the incipient melting point of the superalloy substrate would be acceptable so long as the part is not distorted by the pressure at the elevated temperature. It is also desirable that the mechanical properties of the superalloy not be degraded (through grain boundary growth or otherwise) as a result of the elevated temperature. Preferably, to avoid over-aging the superalloy substrate, the diffusion bonding process should be carried out at a temperature above the aging temperature of the base alloy. Most preferably, the process is carried out between 1750 to 2200 degrees Fahrenheit for the INCONEL sheets.

Additionally, pressures greater or less than 1000 PSI may be appropriate depending upon the surface area of the parts being bonded as well as the bonding temperature. In some cases, for example where the mating surfaces of the parts are sufficiently smooth and the parts are sufficiently massive that the pressure on the joint being bonded can be supplied by the weight of the part itself, heating of the joint in an inert environment may be sufficient to cause the diffusion bonding process to occur without the application of external pressure. More complex shapes than those of FIG. 1 may be bonded using a mechanical hot press heating in an inert environment. Accordingly, any method of applying pressure to the joint while held at an elevated temperature in an inert environment is considered within the scope of the present invention.

In an alternative process according to the present invention, in lieu of welding the sheets 112, 114, 116, 118, 120 and 122 together around perimeter 130, the prepared sheets are instead stacked within a closely-fitting thin-walled metal enclosure that is welded shut in an inert environment.

The assembly consisting of the metal enclosure containing the prepared sheets is then subjected to the elevated pressure and temperature of the hot isostatic press. Under the extreme heat and pressure, the enclosure collapses on the stack of prepared sheets thereby forcing the sheets together and enabling the diffusion bonding process to proceed in the presence of the activator. To prevent the enclosure from bonding to the sheets during the diffusion bonding process, the surfaces of the metal enclosure may be coated with a ceramic, or the enclosure may be made of an incompatible alloy.

In the illustrative embodiment, the diffusion bonded fluidic amplifier is removed from the hot isostatic press and finished to the appropriate final dimensions by removing the perimeter weld and margin 140 adjacent the perimeter weld, using wire EDM or other conventional machining process. Similarly, in the alternative embodiment, the enclosure is removed by wire EDM or other conventional machining process.

Because the diffusion bonding process according to the present invention does not use metallic fillers, but instead activates the surface of the base material itself to form the bond, once the sheets have been bonded, there is no detectable interfacial residue. That is, analysis of cross-sectioned parts cannot detect any residue of the borane-dimethlyamine or the water diluent. This is in stark contrast to brazed assemblies where at least some portion of the metallic filler always remains at the interface.

Although certain illustrative embodiments and methods have been discussed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. A method of bonding a first article formed of a superalloy material to a second article also formed of a superalloy material comprising:

cleaning a surface of said first article;

cleaning a surface of said second article;

applying an activator material to said surface of said first article, said activator material comprising a melting point depressant mixed with a carrier material that is substantially free of Nickel, Cobalt and Iron;

bringing said surface of said first article in contact with said surface of said second article at an interface;

applying a load at said interface to force said surface of said first article and said surface of said second article together; and heating said interface in an inert environment to cause said melting point depressant to diffuse into said surface of said first article and said surface of said second article thereby causing said first and second articles to diffusion bond together.

2. The method of claim 1, further comprising:

applying said activator material to said surface of said second article.

3. The method of claim 1, wherein:

said melting point depressant is a material chosen from the group consisting of boron and silicon.

4. The method of claim 1, wherein:

said activator material comprises an organic boron compound.

5. The method of claim 1, wherein:

said inert environment comprises a vacuum.

6. The method of claim 1, further comprising:

sealing said first and second article in an enclosure containing an inert environment, wherein said step of applying a load at said interface is accomplished by applying a load to said enclosure.

7. The method of claim 1, wherein:

said activator material is a solution containing a melting point depressant dissolved in a liquid.

8. The method of claim 1, wherein:

The step of cleaning a surface of said first article comprises exposing said surface to a halide ion gas.

9. The method of claim 1, wherein:

said activator material is a solution containing a melting point depressant dissolved in water.

10. The method of claim 1, wherein:

the step of heating said interface comprises heating said interface to a temperature above the activation temperature of said interface.

11. The method of claim 1, wherein:

said temperature is above the aging temperature and below the incipient melting point of said superalloy material.

12. The method of claim 1, wherein:

said first and second articles comprise laminated superalloy sheets having a thickness of less than 0.050 inch.

13. A method of bonding a first article formed of a superalloy material to a second article formed of a superalloy material comprising:

cleaning a surface of said first article;

cleaning a surface of said second article;

applying an activator to said surface of said first article, said activator comprising an organic compound containing a melting point depressant;

bringing said surface of said first article in contact with said surface of said second article at an interface;

applying a load at said interface to force said surface of said first article and said surface of said second article together; and heating said interface in an inert atmosphere until said organic compound is disassociated allowing said melting point depressant to diffuse into at least said first article to form a bond between said first article and said second article, said bond having no interfacial residue.

14. The method of claim 13, wherein:

the step of cleaning a surface of said first article comprises exposing said surface to a gaseous halide.

15. The method of claim 14, wherein:

said gaseous halide is hydrogen fluoride.

16. The method of claim 13, wherein:

said melting point depressant is a material chosen from the group consisting of boron and silicon.

17. The method of claim 13, wherein:

The step of applying a melting point depressant to said surface of said first article comprises applying a solution containing said melting point depressant dissolved in a liquid.

18. A method of bonding a first article formed of a superalloy material to a second article formed of a superalloy material comprising:

cleaning a surface of said first article by subjecting said surface to a gaseous halide;

cleaning a surface of said second article by subjecting said surface to a gaseous halide;

applying an activator material to said surface of said first article, said activator material comprising a melting point depressant;

placing said first article and said second article within an enclosure such that said surface of said first article is in contact with said surface of said second article at an interface, said enclosure containing an inert atmosphere; and applying heat and force to said enclosure, to cause said enclosure to transmit heat and pressure to said interface so as to allow said melting point depressant to diffuse into at least said first article to form a bond between said first article and said second article.

19. The method of claim 18, further comprising:

applying a coating to said enclosure to prevent said enclosure from bonding to said first article or said second article.

20. The method of claim 18, wherein:

said melting point depressant is a material chosen from the group consisting of boron and silicon.

21. The method of claim 20, wherein:

said activator material is an amine containing boron.

22. The method of claim 18, wherein:

said activator material is substantially free of Nickel, Cobalt and Iron.

23. The method of claim 18, wherein:

said first and second articles comprise laminated superalloy sheets having a thickness of less than 0.050 inch.

* * * * *